United States Patent
Hantman et al.

(10) Patent No.: US 7,036,684 B1
(45) Date of Patent: May 2, 2006

(54) DIAGONALLY DIVIDED BOTTLE WITH CURVED LINE OF DIVISION DISTINCT FROM EDGE CURVE

(76) Inventors: Ken S. Hantman, 3856 Byron Rd., Huntingdon Valley, PA (US) 19006; Ray Lindsey, P.O. Box 98, E. Winthrop, ME (US) 04343; Chris S. Hantman, 2856 Byron Rd., Huntingdon Valley, PA (US) 19006

( * ) Notice: Subject to any disclaimer, the term of this patent is extended or adjusted under 35 U.S.C. 154(b) by 207 days.

(21) Appl. No.: 10/461,149

(22) Filed: Jun. 13, 2003

Related U.S. Application Data (60) Provisional application No. 60/388,506, filed on Jun. 13, 2002, provisional application No. 60/388,581, filed on Jun. 13, 2002.

(51) Int. Cl.
*B65D 35/022* (2006.01)

(52) U.S. Cl. .................. 222/94; 222/129; 220/505; 215/6

(58) Field of Classification Search ............. 222/94, 222/129, 145.1, 485, 556, 145.5; 220/505, 220/553, 555; 215/6
See application file for complete search history.

(56) References Cited

U.S. PATENT DOCUMENTS

| | | | | |
|---|---|---|---|---|
| 3,506,157 A | * | 4/1970 | Dukess | 222/94 |
| 3,980,222 A | * | 9/1976 | Hood | 229/120.18 |
| 4,148,417 A | * | 4/1979 | Simmons | 222/94 |
| 4,881,652 A | * | 11/1989 | Schiemann | 220/23.8 |
| 4,984,715 A | * | 1/1991 | Green | 222/129 |
| 5,482,170 A | * | 1/1996 | Semersky et al. | 215/6 |
| 5,529,195 A | * | 6/1996 | Valyi | 215/6 |
| 5,927,550 A | * | 7/1999 | Mack et al. | 222/94 |
| 5,941,420 A | * | 8/1999 | Connan | 222/94 |
| 6,223,942 B1 | * | 5/2001 | Markey et al. | 222/94 |
| 6,390,324 B1 | * | 5/2002 | Everette et al. | 220/555 |
| 6,550,647 B1 | * | 4/2003 | Kunz | 222/129 |
| 6,578,739 B1 | * | 6/2003 | Scheifele | 222/94 |
| 6,669,048 B1 | * | 12/2003 | Eva et al. | 220/524 |
| 6,799,699 B1 | * | 10/2004 | LeMarr et al. | 222/94 |
| 6,913,777 B1 | * | 7/2005 | Rebhorn et al. | 426/394 |

* cited by examiner

*Primary Examiner*—Michael Mar
*Assistant Examiner*—Melvin Cartagena (57) ABSTRACT

A diagonally divided bottle in accordance with the preferred embodiments preferably has a greater width than depth. The bottle includes an outer wall, a diagonal inner wall and a bottom wall. The outer wall and the bottom wall cooperate to form an interior divided by the inner wall. The inner wall intersects the outer wall and to the bottom wall to form a fluid tight seal between the divided interior, with the divided interior defining separate interior chambers. The inner wall is arranged at an angle diagonal to a plane tangential to the front of the bottle such that products contained in each interior chamber are simultaneously viewed when the bottle is observed from the front of the bottle.

12 Claims, 6 Drawing Sheets

DIAGONALLY DIVIDED BOTTLE WITH CURVED LINE OF DIVISION DISTINCT FROM EDGE CURVE

This application is a non-provisional of provisional Nos. 60/388,581 and 60/388,506 filed Jun. 13, 2002.

FIELD OF THE INVENTION

This invention relates to plastic containers and nozzles, specifically to ones that are divided into two or more sections.

BACKGROUND OF THE INVENTION

Containers or bottles made of leather, glass, plastic and other materials have been manufactured to store and deliver ingredients such as different liquors, body moisturizing lotions, chemical drain cleaners, two-part epoxies, drugs, food products including condiments, and other things which either benefit by being separately dispersed or are activated at the time of dispersal by mixing.

A dual chambered flask or bottle invented by Jacob Gruenebaum (U.S. Pat. No. 284,127) in August 1883 presented two oppositely inclined necks to obviate the need to raise the flask overly much for the purpose of imbibing its liquors or wines. However, this design would not stand on a shelf nor be suitable to contents of greater viscosity. A duplex tube was introduced by F. Stegath (U.S. Pat. No. 1,363,064, Dec. 21, 1920) which presented the convenience of keeping complementary items such as shaving cream and lotion at hand in one container, in this case a flexible squeezable metal tube. This would not be suitable to storage in an upright position on a shelf nor is it suitable for food products due to the strong association of such tubes with toiletry and medicinal items.

Various containers (e.g., Huenergardt, U.S. Pat. No. 2,661,870, December, 1953; Kuster, U.S. Pat. No. 3,197,071, December, 1962; Hoffman, U.S. Pat. No. 3,206,074, September, 1965; Newton, U.S. Pat. No. 3,467,269, September, 1969) present designs suitable to displaying and storing on a shelf, however they are unduly complicated and expensive to manufacturer. Dukess (U.S. Pat. No. 3,506,157, April, 1970) invented a closure device to seal a multiple chamber tube or bottle. The ingredients would tend to intermix upon the flat surfaces normal to the prongs. The invention of D. Gold Et Al (U.S. Pat. No. 3,729,553, April, 1973) is bulky and does not explain in what method the portrayed bottle is to be manufactured. Simmons (U.S. Pat. No. 4,148,417, April, 1979) invented a fluid dispenser having dual chambers formed by a cast molding process or, it was claimed, a blow-molding process. However, an adequate method to control the blow-molding of such a dual chamber is not reliably described.

Simmons is a dual-chamber container of substantially circular cross section and therefore the division is essentially identical to a longitudinal seam of an edge of the bottle when viewed frontally. In this it lacks the distinct graceful curving division inherent in the present invention. It is not addressed to and cannot as effectively serve the object of the present invention which is the attractive display of multiple contained ingredients in a consumer product.

Hood (U.S. Pat. No. 3,980,222, September, 1976) is a divided tetrahedral tube formed by looping, spindling and sealing and is therefore not a complexly curved surface. The line of division when viewed frontally is a straight line.

In traditional blow-molding the plastic is blown against the solid walls of an encasing metal mold. In order to make a dual chamber tube or bottle with a blow-molding process, two singularly molded halves are formed and glued together. The side-by-side nozzles are bulky or awkward and do not achieve the simplicity and efficiencies that is one of the aims of the present invention, nor do the nozzles achieve the aesthetic or marketing appeal. A further disadvantage is the splotchy appearance of glue on the dividing surface.

Markay et al. (U.S. Pat. No. 6,223,942 B1, May, 2001) is the only prior art known to the present inventors to address the object of displaying both of two contained ingredients simultaneously to a consumer. However, its method of two offset, conjoined separate bottles joined by a common cap sacrifices the sense of unity of a smoothly surfaced divided bottle that is an aim of the present invention.

Other background containers are directed to separating ingredients while stored but intermixing them before application of the ingredients for the purpose of activating the ingredients. Examples of such ingredients include body lotions, moisturizers, chemical drain cleaners, etc. One known design intermixes mustard and ketchup before application. The intermixing produces an unsavory appearance and loses any aesthetic delight of drawing designs in a dual color stream.

In known dual chamber bottles; a simple utilitarian joining of two halves has been utilized for such items as drain cleaners and two-part epoxies, or the ingredients and the means of separation are not viewable because the outer walls are opaque. Such packaging is not suitable to the demands of marketing and merchandising in highly competitive or "high-end" areas such as foods and cosmetics. Except for one instance which addressed the need to display both ingredients in a dual-ingredient bottle in an aesthetic way but did so losing the unity of a "single bottle", the display and marketing function of the bottle, as opposed to simple containment, has not been addressed. Clearly this is an unrecognized problem when it comes to the real world of selling products in bottles. The present invention addresses and solves this problem.

In order to disperse the ingredients the bottle should be able to be squeezed. It is understood that a divider in a bottle strengthens the bottle in the planar direction of the divider, making it more difficult to squeeze the bottle in the planar direction. Most bottles for display on shelves are wider than they are deep. Any division of the bottle perpendicular to the front or back would inhibit the squeezing of the bottle because the squeezing would most desirably occur in the perpendicular direction along the divider. The present invention overcomes this problem, allowing the bottle to be squeezed in the normal and preferable way.

Alternatively, if the known bottle was divided such that the front and back halves were separated, then one ingredient would not be visible when the bottle was displayed facing front on a shelf. The present invention overcomes this problem as well.

Indeed the containment and display of products is a crowded field, and the need to present certain things in dual chamber bottles, such as mustard and ketchup, has long been felt but, despite market need, has not previously been met.

Accordingly, the background art has the disadvantages of at least being unduly complicated in design and costly in manufacture, not being suitable to standing on a shelf for display, failing to address the display function of the bottle, or losing the unity of the bottle for this purpose.

SUMMARY OF THE INVENTION

The invention includes a bottle and method of providing the bottle with a diagonal section having a preferably flat plane intersecting the curved outer walls of the bottle such that both contained ingredients . . . are visible at once when the bottle is displayed when viewed from the front of the bottle. This function or utility is independent of the exact shape or design of the bottle and is incident upon and integral with the method of constructing the bottle.

The invention also includes a bottle and method for providing the bottle with three or more stipples or raised lines on the surface of one portion of the bottle with corresponding indentations or scored lines on another portion of the bottle to orient and align the bottle portions for gluing.

The invention also includes a bottle and method for providing the bottle with one or two faces of an inner wall forming a "knife edge" of a tapered upper edge of a flat side or sides of the bottle, the edge standing proud above the circular rim formed by the joining of the two bottle portions. The compression of a twist-on cap or snap-on cap against this knife-edge forms a seal which keeps the two ingredients separate.

The invention also includes a bottle and method for providing the bottle with a knife-edge standing proud, and a twist-on cap containing two apertures.

Alternatively, everything above referred to in respect to two ingredients is also applicable to two or more ingredients by use of two of more sections affixed in a similar manner as will be discussed in greater detail below.

The invention includes a bottle and method for providing the bottle with bottle cap apertures, the square surface areas of which are proportioned as the corresponding volumetric areas of the bottle so sectioned.

The invention also includes an ergonomically improved flip-cap oriented so that the lip an détente for the flip-cap top is perpendicular to the divider wall which itself is angled at less than or equal to 90 degrees and preferably approximately 30 degrees to a line dividing the bottle front to back. The flip-cap preferably includes two tapered plugs snap down into two corresponding raised apertures in a lower flat undercap, said two tapered plugs affecting a seal and reducing intermixing of ingredients upon the surface of an undercap.

The invention also includes a twist-on or snap-on spout or nozzle, preferably of a tapered conical or cylindrical shape, and internally divided. The spout or nozzle is adapted to be sealed by an end cap, a plug, by helically twisting the "overcap" upon a "scaling rod", or by sliding upon an internal shaft affecting a seal when screwed or pushed downwards towards the bottle.

BRIEF DESCRIPTION OF THE DRAWINGS

The invention will be described in conjunction with the attached drawings in which like referenced numerals designate like elements, and wherein.

DETAILED DESCRIPTION OF THE INVENTION

In accordance with the present invention a dual (or multiple) chamber bottle comprises a curved outer bottle formed as or forming a single container. The bottle is internally diagonally divided by an inner (preferably) planar curtain or wall, forming a curving line at the point of intersection with the outer bottle when viewed from the face or obverse face of the bottle.

Figure 1:
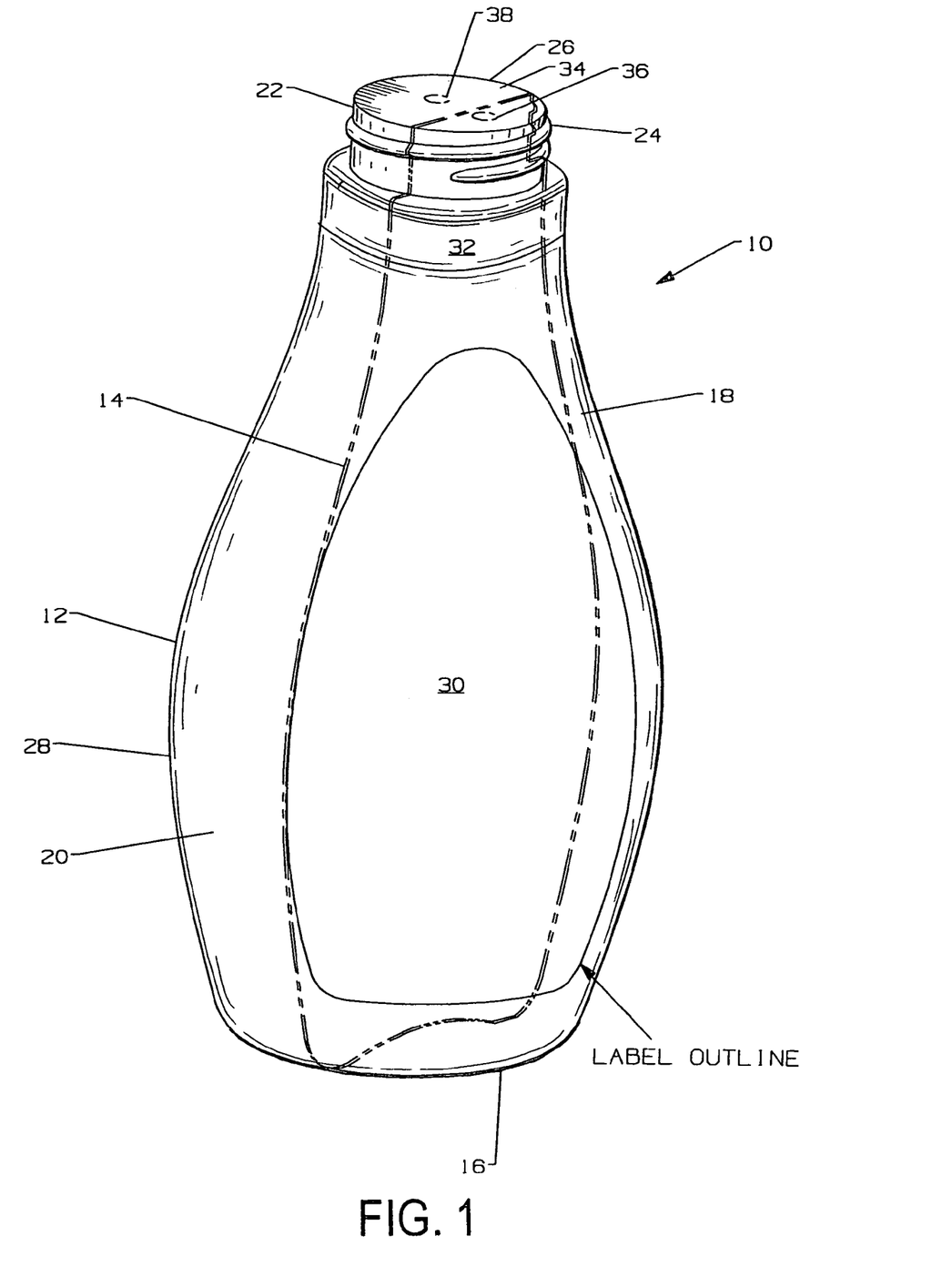
FIG. 1 is a perspective view of a diagonally divided bottle in accordance with the preferred embodiment of the invention.

FIG. 1 shows a diagonally divided bottle 10 in accordance with a preferred embodiment of the invention. The bottle 10 includes an annular outer wall 12, an inner wall (or curtain) 14 and a bottom wall 16. The annular outer wall 12 and bottom wall cooperate to form an interior divided by the inner wall 14, which seals to the outer wall 12, preferably during a blow-molding process, to form a fluid tight seal between the divided interior, and to define separate interior chambers 18, 20.

The outer wall 12 includes an upstanding mouth 22, preferably having an exterior threaded neck 24 for allowing rotational engagement with a flip cap (FIG. 2) having interior threads, notches or teeth arranged to match the exterior threads of the neck 24. The mouth 22 has a rim 26 arranged to seal against a lid or cover for sealing contents in the interior chambers 18, 20.

The inner wall 14 extends from the bottom wall 16, along the outer wall 12 at least to the rim 26 of the mouth 22 sufficiently to abut the cap or cover and maintain a sealed separation of the interior chambers 18, 20. While not being limited to a particular theory, the inner wall 14 preferably extends above the mouth 22, standing proud of the rim 26 sufficiently to make a positive seal with a lid, as will be described in greater detail below. While a flat plastic, paper or foil cover may attach to and extend across the rim 26, a screw-on lid or cap, having an integral depending skirt with matching threads may not seal across the rim 26, forming a gap between an interior underside of the cap, and the mouth. In this situation, the interior wall 14 extends above the rim 26 for abutting the interior underside of the cap to form a seal separating the interior chambers 18, 20, as will be described in greater detail below.

Figure 2:
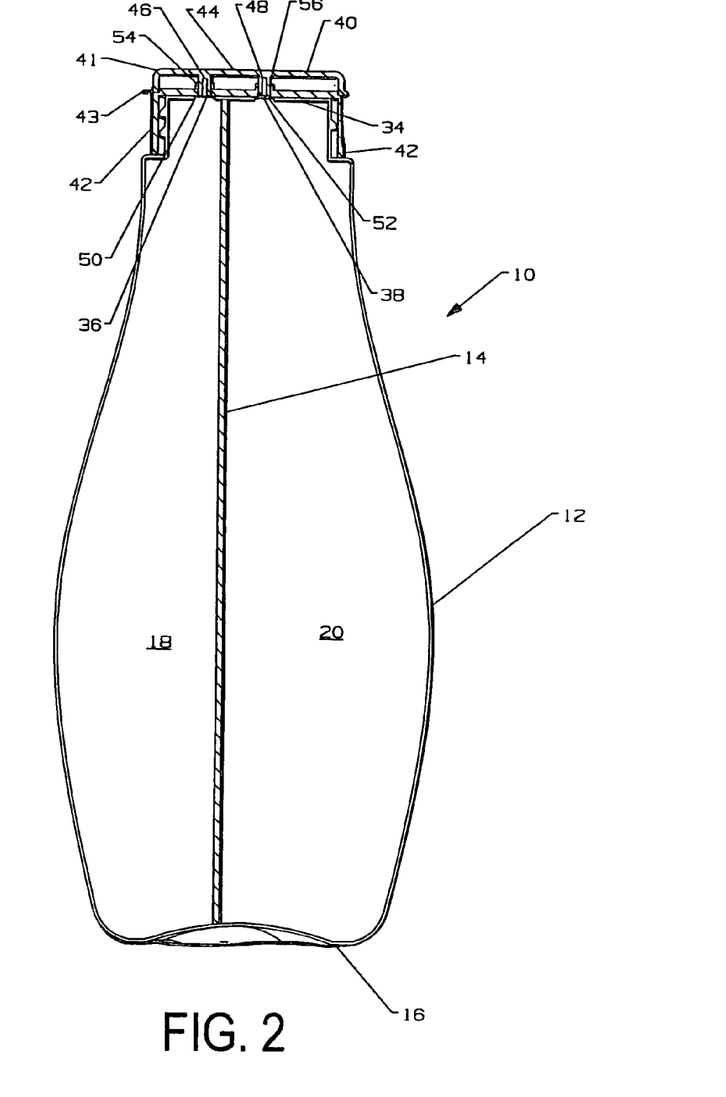
FIG. 2 is a sectional view of the bottle shown in FIG. 1 with a flip cap in accordance with the preferred embodiment of the invention.

FIG. 2 is a sectional view showing a preferred cooperation for sealing the interior chambers 18, 20. As shown, the bottle 10 includes a flat cover 34 made of a plastic, paper or foil that extends across and is defined by the rim 26. The cover 34 attaches to the rim 26 around the mouth 22 to form a seal against the rim 26. As can best be seen in FIG. 2, the inner wall 14 or curtain extends up to and abuts the cover 34, forming a seal along the abutment that prevents contents of one interior chamber 18, 20 from spilling over into the other interior chamber 20, 18. The cover 34 includes a cover aperture over each interior chamber for allowing communication to each chamber. In FIG. 2, cover aperture 36 allows fluid access from interior chamber 18 outside the bottle 10, and cover aperture 38 allows fluid access from interior chamber 20 to outside the bottle 10.

Figure 4:
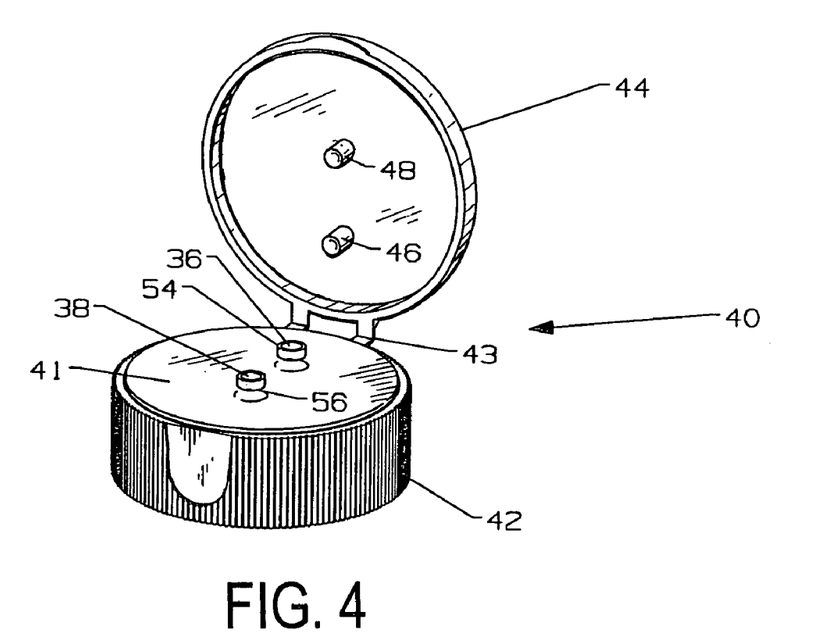
FIG. 4 is a perspective view of the flip cap shown in FIG. 2 in a semi-open position.
Figure 5:
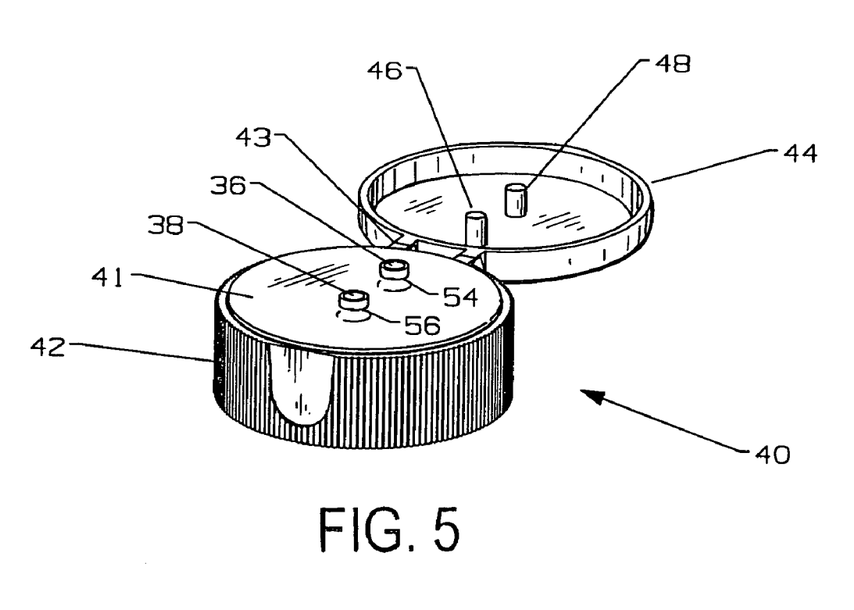
FIG. 5 is a perspective view of the flip cap of FIG. 2 in a fully opened position.
Figure 6:
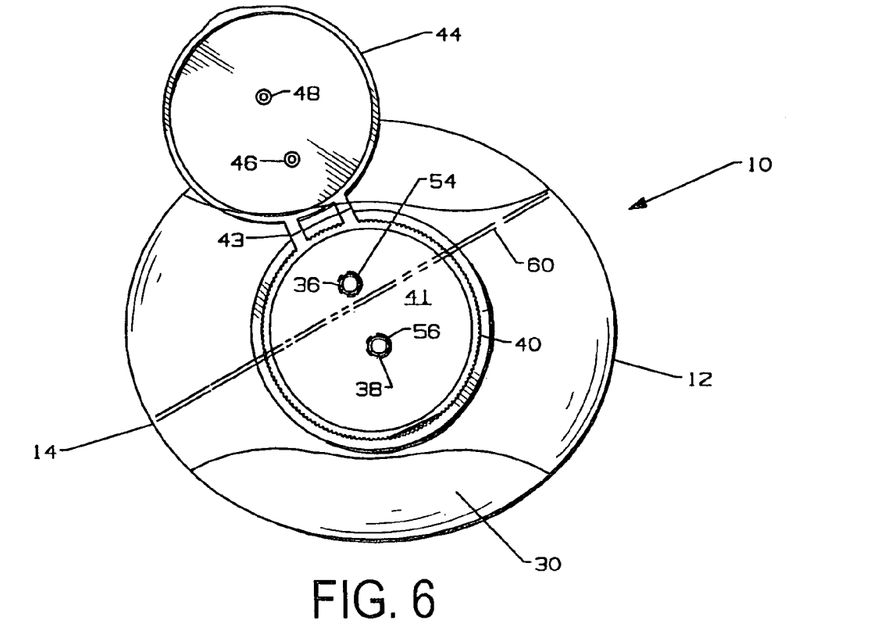
FIG. 6 is a top view partially in section of the diagonally divided bottle as shown in FIG. 2 with the flip cap in an open position.

The bottle shown in FIG. 2 also includes a flip cap 40 having an interior undercap 41 with an integral depending skirt 42. The skirt 42 has interior threads, notches or teeth adapted to match the threads of the neck 24. As can best be seen in FIGS. 2–6, the interior undercap 41 includes two top apertures 50, 52, each aperture surrounded by an annular boss 54, 56. The cap 40 is preferably compression molded and includes a pivotally mounted overcap 44 having plugs 46, 48 arranged to fit into the inner portion of the annular bosses 54, 56 and top apertures 50, 52. The flip cap 40 is arranged to close over the bottle 10 such that the plugs 46, 48, top apertures 50, 52 and annular bosses 54, 56 are aligned over the cover apertures 36, 38 of the flat cover 34, respectively. Thus when the flip cap 40 is opened, such as shown in FIGS. 4–6, the apertures of the bottle 10 and the flip cap 40 cooperate to provide access to the interior chambers 18, 20, and the products therein. The flip cap 40 is one example of a bottle cap assembly for keeping products in each chamber separate in the bottle and through the assembly. Bottle caps within the scope of the invention are thus not limited to the flip cap 40 discussed herein.

Regarding the flip-cap 40, the two plugs 46, 48 snap down into their corresponding raised annular bosses, 54, 56 in the undercap thus affecting a seal and preventing the intermixing of ingredients upon the surface of the undercap 41. The overcap 44 is preferably joined to the undercap 41 by a hinge 43 (e.g., butterfly or living) to accommodate the pressure of the two-plug flip-cap 40. However no hinge is required to affect the closure. In any event the overcap 44 preferably should exceed about 1¼ inches in diameter for reasons of safety associated with children swallowing small parts.

Figure 7:
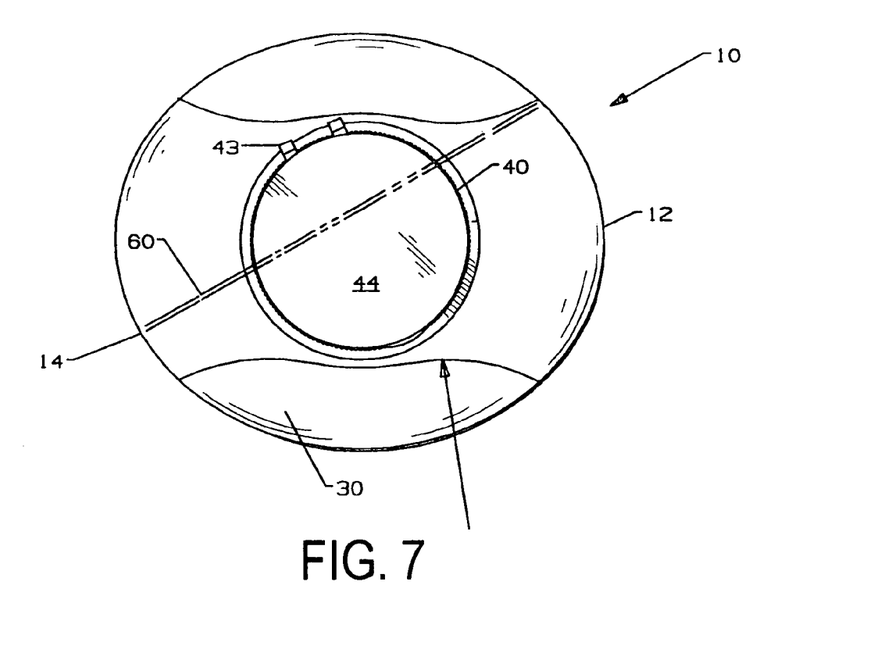
FIG. 7 is a top view partially in section of the bottle and flip cap of FIG. 2.

While not being limited to particular theory, the bottle 10 is somewhat conal and cylindrical in shape, having a wider midsection 28 and tapered near the neck 24 and bottom wall 16. The bottle 10 shown in FIG. 1 includes a label 30 on the front of the bottle 10 and a label 32 wrapped around the neck for identification of the products inside the bottle 10. The label 30 is preferably attached to the front of the bottle 10 by an adhesive (e.g., glue) and is defined by its outline 31 or may be part of an encircling shrink-wrapped label in which the label portions outside the outline 31 are preferably clear. The bottle 10 is preferably wider (along its front and back), than deep (along its sides) when the bottle is standing on its bottom wall 16. The bottle 10 may also include a label on the back of the bottle for further identification or information of the product. The inner wall is shown diagonally intersecting the bottle so that both products in the bottle can be viewed simultaneously from the front of the bottle. As best shown in FIGS. 2, 6 and 7, the inner wall 14 may be offset from the central longitudinal axis of the bottle when more of one product is desired in the bottle (e.g., two thirds ketchup, one third mustard).

While much attention is devoted to the design of the shape of a bottle, which is typically complexly curved for aesthetic appeal and to fit a person's grasp, this effort is lost or compromised by the utilitarian appearance of a line of division between two ingredients in a dual chamber bottle. In the present invention, the intersection of the complexly curved exterior by a preferably planar inner curtain or wall diagonally oriented with respect to the side-to-side plane of the bottle, achieves an extremely aesthetically appealing curving line of division between the displayed ingredients.

The divided bottle is economically formed and it arises intrinsically from application of the preferred method regardless of the particular shape of the complexly curved bottle. The function of displaying ingredients for marketing purposes, as well as the containment and dispersal of the ingredients is thus met in a simple unified bottle design achieving great functional and aesthetic appeal.

Figure 8:
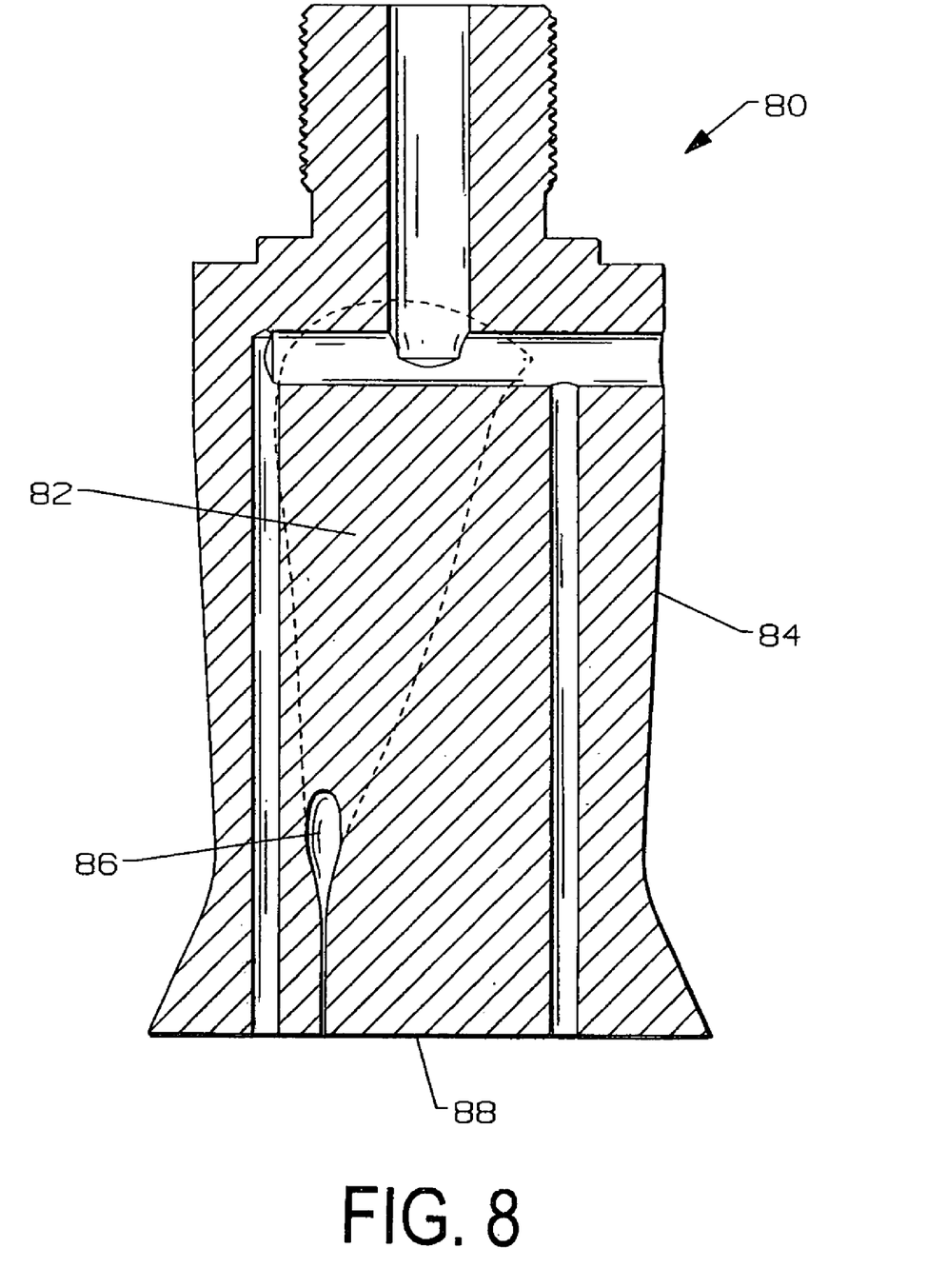
FIG. 8 is a sectional view of a mandrel used in accordance with the preferred embodiments of the invention.

In the preferred method of the invention, the inner wall 14 is blow molded in the bottle 10 when the bottle is formed. Without being limited to a particular theory, a preferred blow-molding process for making the diagonally divided bottle 10 is described in U.S. Application No. 10/461,112, filed the same date as this application, Jun. 13, 2003, the disclosure of which is incorporated herein by reference in its entirety. In particular, the preferred process is an extrusion blow molding method that forms a parison by simultaneously extending plastic around and through a special mandril 80 shown in FIG. 8. The mandril 80 is special as it includes channels 82 along its side 84 that pull liquid plastic into a central or nearly central slot 86 that extends across the mandril down to the bottom side 88. The plastic flows out of the mandril both through the slot and around the mandril forming a parison. The formed parison has an inner divider wall or curtain within the parison wall. A split cavity mold closes around the parison with the curtain inside. The split cavity mold is cooled, preferably with chilled water and closed.

Figure 9:
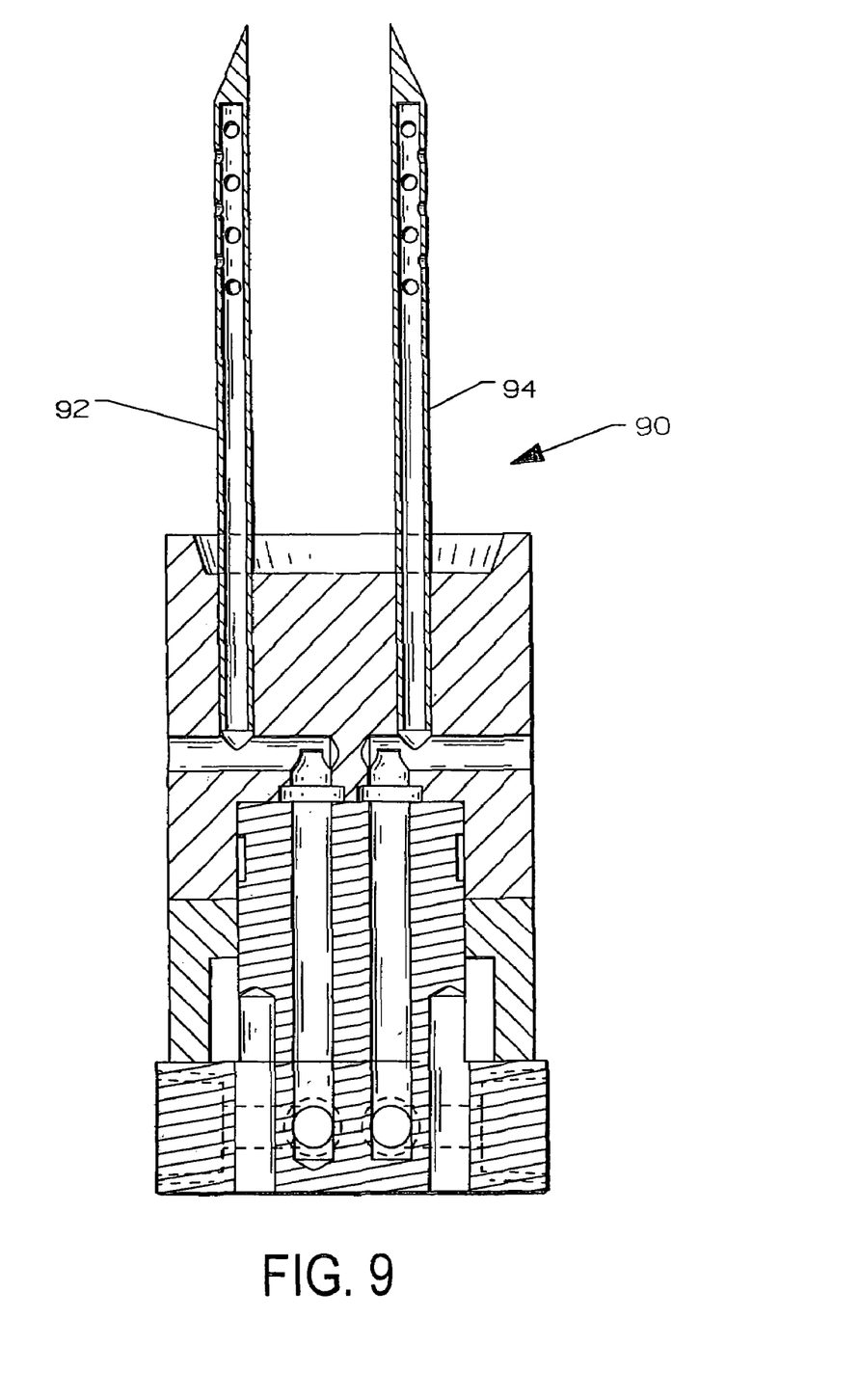
FIG. 9 is a sectional view of an exemplary dual chamber blow needle device used in accordance with the preferred embodiments of the invention.

After the mold is closed, compressed air is introduced to each side of the mold cavity causing the parison to inflate around the inside wall of the split cavity mold while suspending the curtain by air inside the cavity. An exemplary dual chamber blow needle device 90 is shown in FIG. 9, having a separate needle 92, 94 for each chamber 18, 20. This blow-molding step forms the plastic bottle 10 and the bottle is cooled. Once the plastic bottle 10 is cooled, the mold opens and the blow-molding machine ejects the bottle.

Naturally the effect of this design is enhanced by filling a transparent or translucent bottle with ingredients of different colors, however the functional accomplishments of the invention with respect to dispersal and ease of handling would pertain even if the ingredients were of the same color or themselves cleat.

The preferred embodiments show a bottle and method for providing the bottle with an inner diagonal section, curtain or wall 14 intersecting the outer wall 12 of the bottle 10 (preferably curved outer walls) such that both contained ingredients are visible at once when the bottle is viewed from the front. This function or utility is independent of the exact shape or design of the bottle and is incident upon and integral with the method of constructing the bottle. In other words, the invention is not limited to any particular bottle shape or design. The aesthetic look of the curvilinear line of division is achieved using the economical preferably flat planar division method described herein.

Any ratio of the two ingredients may be achieved by having the diagonal wall intersect the center of the bottle (when viewed from above) or being displaced more or less from this center. This is portrayed in the drawings. Accordingly even a 50/50 ratio can be displayed with the curvilinear effect rather than the unremarkable or relatively less aesthetic display of a bottle split down the middle right and left. In the preferred embodiment the products or ingredients have a ratio offset from 50/50, and most-preferably about a 1/3 to 2/3 ratio.

The preferred offset of the inner wall 14 can best be seen in FIGS. 2, 6 and 7. FIG. 2 shows a sectional view of the offset inner wall 14, while FIGS. 6 and 7 are top views of the bottle 10 showing the offset inner wall 14 as a dashed line 60 across the bottle 10 and flip cap 40. This offset is most desirable when a seller wants to sell more of a first product in the bottle than a second product (e.g., more ketchup than mustard). Preferably both products are expelled at a rate that corresponds to the volume of the product's respective chamber (e.g., if the products have a 1/3 to 2/3 volume ratio, then the first product is expelled half as fast as the second product). To help ensure that both chambers empty the products evenly, so that the amount of both products remaining in the bottle corresponds with the volume in both chambers (e.g., both products empty at the same time), the opening of the flip cap 40 can be sized to correspond to the thickness of the respective product. For example, if the products in both chambers have the same thickness, then the opening 52 should be larger than the opening 50. Accordingly, the square surface areas of the bottle cap apertures are proportional to the corresponding volumetric areas of the bottle so sectioned.

Figure 3:
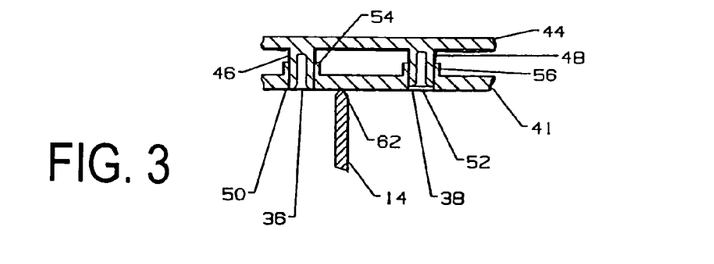
FIG. 3 is a partial sectional view of another preferred embodiment of the invention.

FIG. 3 shows a partial section of the bottle 10 wherein the top edge of the inner wall forms a knife edge 62 near the mouth 22 of the bottle. While not being limited to a particular theory, the top edge extends beyond and stands proud above the rim 26 formed by outer wall 12 of the bottle 10. In this preferred embodiment, the compression of the twist-on cap 40 or of an equivalent snap-on cap against this knife-edge 62 forms a seal, which keeps the two ingredients separate.

The embodiment in FIG. 3 is thus different than the embodiment shown in FIG. 2, which includes a cover 34 across the bottle's top circular rim 26. In FIG. 2, the top edge of the inner wall extends across the top circular rim 26 against the cover 34 to form a seal that keeps the two ingredients separate. In FIG. 3, the bottle 10 does not include a flat cover 34, so the inner wall 14 extends beyond the rim 26 to be sealed by compression of the cap 40.

It is understood that everything above referred to in respect to two ingredients is also applicable to two or more ingredients by use of two of more sections affixed in a similar manner.

The embodiments exemplified in FIGS. 2, 4, 5, 6 and 7 also show a diagonally divided bottle including the ergonomically improved flip-cap 40 oriented to include so that the lip and détente for the flip cap is perpendicular to the divider wall 14 which itself is preferably angled at approximately 30 degrees to a line dividing the bottle front to back; this corresponds to the natural ergonomic position of the thumb of the right hand when the bottle is held by the left hand. Whereas bottle caps are often so positioned they normally appear askew given the visual clues of the bottle, and in this sense do not follow best ergonomic design. In our preferred embodiment design the visual clues are congruent with the functional design thus improving the ergonomics of use.

One equivalently structured flip cap 40 for the diagonally divided bottle 10 includes a twist-on or snap-on spout or nozzle, preferably of a tapered conical shape itself internally divided, and sealed either by means of an end cap or plug, by helically twisting its overcap upon a scaling rod, or by sliding upon an internal shaft, affecting a seal when screwed or pushed downwards towards the bottle 10. In this case, because the nozzle is divided, two internal spouts, themselves helically shaped, fit through helical bores through the overcap as they reach the sealed position.

The preferred material is a polypropylene (PP) with the mold polished for contact clarity. Alternatively, a high density polyethylene (HDPE) or a low density polyethylene (LDPE) or PVC . . . or PVC or other similar materials can be used. As an alternative to bonding with glue, the stipple/dimple may be heat-fused by laser, secured by mechanical approaches or held together by an encasing band.

It should be apparent from the aforementioned description and attached drawings that the concept of the present application may be readily applied to a variety of preferred embodiments, including those disclosed herein. For example, the diagonally divided bottle may also include dip-tubes with a dispensing spout that crowns a snapped-on cap and functions by depressing the pump-action head connected to the tubes, as understood by a skilled artisan. Without further elaboration, the foregoing will so fully illustrate the invention that others may, by applying current or future knowledge, readily adapt the same for use under various conditions of service.

What is claimed is:

1. A blow molded complexly curved diagonally divided bottle having a greater width than depth, the bottle comprising an outer wall, a diagonal preferably planar inner wall member and a bottom wall, the outer wall and the bottom wall cooperating to form a divided interior, divided by the inner wall member, the inner wall member intersecting the outer wall and the bottom wall to form a fluid tight seal between the divided interior, the divided interior defining separate interior chambers, the inner wall arranged at an angle diagonal to a plane tangential to a front of the bottle such that products contained in each interior chamber can be simultaneously viewed when the bottle is observed from the front of the bottle;

whereby said inner wall member upon intersection of said outer wall forms a curved line of intersection which is not coincident with nor parallel to nor equal to a longitudinal edge or seam of said bottle viewed frontally such that a visually attractive and graceful display of both or multiple ingredients is simultaneously effected.

2. The bottle of claim 1, further comprising a label selected from the group consisting of a label attached to the front of the bottle or a label shrink-wrapped encircling the bottle, the label identifying the products contained in each interior chamber.

3. The bottle of claim 1, wherein the inner wall extends from the interior beyond a top rim of the outer wall to form an inner wall edge standing proud above the rim.

4. The bottle of claim 3, further comprising a cap, the compression of the cap against the proud inner wall edge forming a seal that keeps the products within each interior chamber separate.

5. The bottle of claim 1, further comprising a knife-edge standing proud formed with a twist-on cap having two apertures, each aperture arrange to cooperate with a respective one of the interior chambers.

6. The bottle of claim 1, further comprising a preferably flat plane intersecting the outer wall, the bottom wall and the inner wall of the bottle to define a third interior chamber.

7. The bottle of claim 1, further comprising bottle cap apertures, each aperture having a square surface area proportional to the corresponding volumetric areas of the interior chamber aligned with the cap aperture.

8. The bottle of claim 1, further comprising a flip-cap arranged so that a lip and détente for the flip-cap is perpendicular to the interior wall which itself is angled at approximately 30 degrees to a line dividing the bottle front to back.

9. The bottle of claim 8, said flip-cap including two tapered plugs snapped down into two corresponding raised bosses and apertures in a lower flat undercap, said two tapered plugs arranged to affect a seal and prevent intermixing of ingredients upon the surface of the undercap.

10. The bottle of claim 1, further comprising a spout having a tapered conical shape and internally divided, said spout sealed by one of an end cap, a plug, a helically twisted overcap, or an internal shaft.

11. The bottle of claim 1, further comprising an adhesive arranged to seal the inner wall to the outer wall and to the bottom wall.

12. The bottle of claim 1, wherein the inner wall is substantially non-planar.

* * * * *